United States Patent
Enomoto et al.

(10) Patent No.: US 11,322,992 B2
(45) Date of Patent: May 3, 2022

(54) FRAME CONTROL APPARATUS, CHARGING APPARATUS, POWER RECEIVER AND POWER FEEDING APPARATUS

(71) Applicant: Asahi Kasei Microdevices Corporation, Tokyo (JP)

(72) Inventors: Hiroaki Enomoto, Tokyo (JP); Shiro Taga, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 385 days.

(21) Appl. No.: 16/660,843

(22) Filed: Oct. 23, 2019

(65) Prior Publication Data

US 2020/0185977 A1   Jun. 11, 2020

(30) Foreign Application Priority Data

Dec. 7, 2018   (JP) .............. JP2018-230198

(51) Int. Cl.
*H02J 50/80* (2016.01)
*H02J 7/02* (2016.01)
*H04W 72/04* (2009.01)
*H02J 50/20* (2016.01)
*H04W 56/00* (2009.01)
*H02J 50/40* (2016.01)

(52) U.S. Cl.
CPC .............. *H02J 50/80* (2016.02); *H02J 7/025* (2013.01); *H02J 50/20* (2016.02); *H02J 50/40* (2016.02); *H04W 56/001* (2013.01); *H04W 72/0446* (2013.01)

(58) Field of Classification Search
CPC .. H02J 50/80; H02J 7/025; H02J 50/20; H02J 50/40; H04W 56/001; H04W 72/0446
See application file for complete search history.

(56) References Cited

U.S. PATENT DOCUMENTS

| | | | |
|---|---|---|---|
| 3,463,887 A * | 8/1969 | Ito ..................... | H04J 3/0605 370/509 |
| 4,006,302 A * | 2/1977 | Reisinger ............. | H04J 3/06 370/299 |
| 8,338,991 B2 | 12/2012 | Von Novak | |
| 2015/0223014 A1 | 8/2015 | Lefley | |

FOREIGN PATENT DOCUMENTS

| | | | |
|---|---|---|---|
| JP | H10-84337 A | * | 3/1998 |
| JP | 3424586 B2 | * | 7/2003 |
| JP | 2008206325 A | | 9/2008 |
| JP | 2017123730 A | | 7/2017 |

\* cited by examiner

*Primary Examiner* — Stacy Whitmore

(57) ABSTRACT

To provide a frame control apparatus for controlling communication frames of a power feeding system, provided is a frame control apparatus that controls communication frames of a wireless power feeding system, the frame control apparatus including a reference clock generating section that generates a predetermined reference clock signal; a demodulating section that operates according to the reference clock signal and demodulates a synchronization command for synchronizing the communication frames; a rate calculating section that counts pieces of rate reference data having a predetermined length and included in the synchronization command, based on the reference clock signal, to calculate a rate reference value used for reference; and a frame control section that controls the communication frames based on the rate reference value.

16 Claims, 6 Drawing Sheets

FRAME CONTROL APPARATUS, CHARGING APPARATUS, POWER RECEIVER AND POWER FEEDING APPARATUS

The contents of the following Japanese patent application are incorporated herein by reference:
No. 2018-230198 filed in JP on Dec. 7, 2018

BACKGROUND

1. Technical Field

The present invention relates to a frame control apparatus, a charging apparatus, a power receiver, and a power feeding system.

2 Related Art

A conventional wireless power feeding system is known in which a charging apparatus transmits and receives wireless signals between a power transmitter and a power receiver, as shown in Patent Document 1, for example.
Patent Document 1: U.S. Pat. No. 8,338,991

However, there are cases where the reference clock for counting frames with the power transmitter and the reference clock for counting frames with the power receiver have different error amounts. In such a case, there is a concern that the timings of different time slots will overlap, and interference will occur in the load modulation.

SUMMARY

According to a first aspect of the present invention, provided is a frame control apparatus that controls communication frames of a wireless power feeding system, the frame control apparatus comprising a reference clock generating section that generates a predetermined reference clock signal; a demodulating section that operates according to the reference clock signal and demodulates a synchronization command for synchronizing the communication frames; a rate calculating section that counts pieces of rate reference data having a predetermined length and included in the synchronization command, based on the reference clock signal, to calculate a rate reference value used for reference; and a frame control section that controls the communication frames based on the rate reference value.

According to a second aspect of the present invention, provided is a charging apparatus comprising a charging section that charges a power storage section; and the frame control apparatus according to the first aspect.

According to a third aspect of the present invention, provided is a power receiver comprising an antenna that receives a wireless signal from a transmitter; the charging apparatus according to the second aspect; and a power storage section that is charged by the charging apparatus.

According to a fourth aspect of the present invention, provided is a power feeding system comprising one or more power receivers, each being the power receiver according to the third aspect; and a power transmitter that transmits a wireless signal for charging the power storage section to the power receiver.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1A:
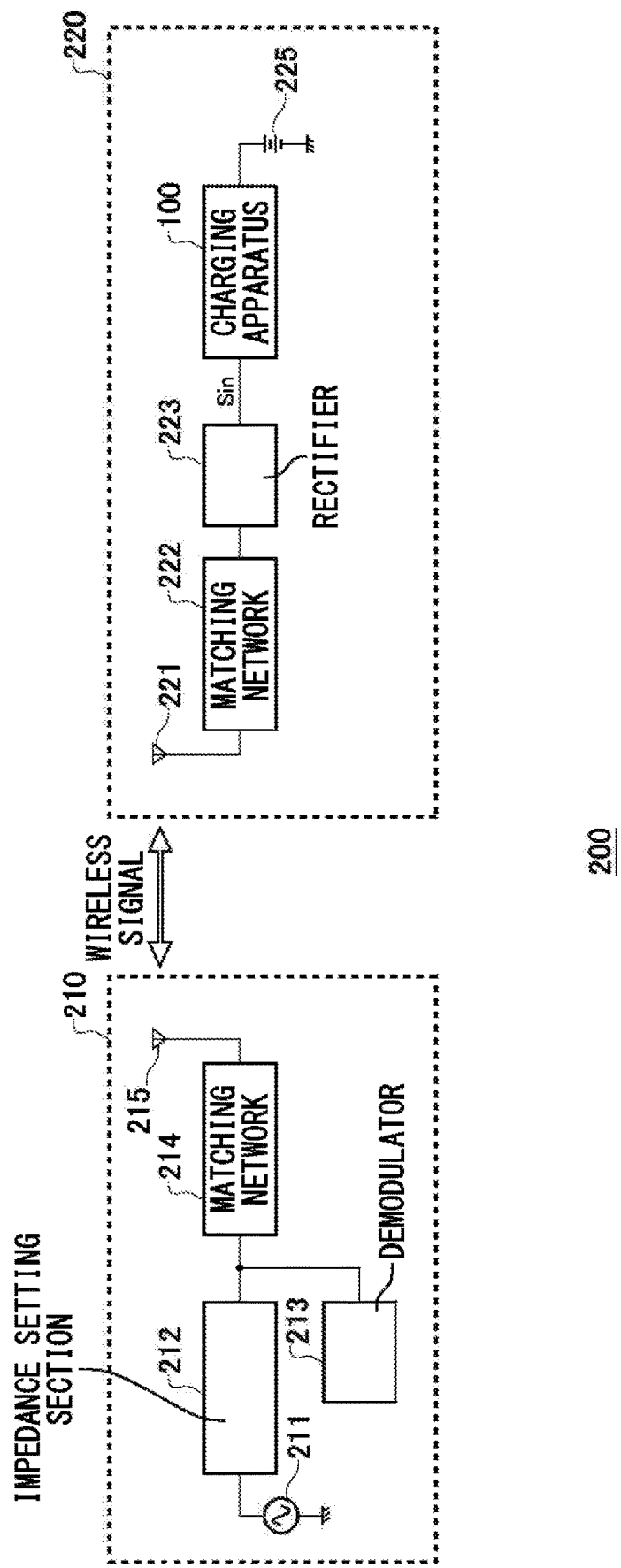
FIG. 1A shows an example of a configuration of a power feeding system 200.

FIG. 1A shows an example of a configuration of a power feeding system 200. The power feeding system 200 includes a power transmitter 210 and a power receiver 220.

The power feeding system 200 is a wireless power feeding device that charges a power storage section 225 by transmitting and receiving wireless signals between the power transmitter 210 and the power receiver 220. Furthermore, the power feeding system 200 realizes the transmitting and receiving of information between the power transmitter 210 and the power receiver 220 by using load modulation communication.

The power transmitter 210 transmits to the power receiver 220 a wireless signal for wireless power feeding. The power transmitter 210 includes a power source 211, an impedance setting section 212, a demodulator 213, a matching network 214, and an antenna 215. The power transmitter 210 inputs a current supplied from the power source 211 to the matching network 214, and transmits this current as a wireless signal from the antenna 215. The impedance setting section 212 sets the impedance of the power transmitter 210. The demodulator 213 demodulates the signal that has been modulated by the power receiver 220.

The power receiver 220 receives the wireless signal from the power transmitter 210, and charges the power storage section 225. The power receiver 220 includes a charging apparatus 100, an antenna 221, a matching network 222, a rectifier 223, and a power storage section 225. The wireless signal received by the antenna 221 is input to the charging apparatus 100, via the matching network 222 and the rectifier 223. The rectifier 223 converts the wireless signal received by the antenna 221 into current of an input DC voltage.

The charging apparatus 100 realizes the load modulation communication from the power receiver 220 to the power transmitter 210 by modulating the impedance (i.e. the load). Furthermore, the charging apparatus 100 functions as a switching charger, such as a DC-DC conversion circuit, to charge the power storage section 225. An input signal Sin corresponding to the wireless signal is input to the charging apparatus 100.

The power transmitter 210 and the power receiver 220 are joined by electromagnetic waves, by the antenna and matching network included in each of these devices. For example, the power transmitter 210 and the power receiver 220 transmit and receive signals using microwaves. The power transmitter 210 includes a finite impedance as a signal source, and supplies a finite power to the power receiver 220. The power received by the power receiver 220 changes depending on the impedance of the power receiver 220, and if the impedances of the power transmitter 210 and the power receiver 220 are equal, the power of the power receiver 220 is at a maximum (in other words, maximum transmission efficiency).

In load modulation communication, it is possible to transmit and receive various types of charging information such as an alarm from the power receiver 220 or information concerning insufficient transmission power or excessive transmission power to the power receiver 220 or the charging situation. By including a load modulating section, the power transmitter 210 may transmit various commands to the power receiver 220. The load modulating section of the power transmitter 210 can realize the load modulation communication by switching the output impedance or switching the gain of a power transmission circuit.

The power storage section 225 is wirelessly charged by the power feeding system 200. The power storage section 225 is provided in the power receiver 220, but may instead be provided outside the power receiver 220. For example, the power storage section 225 is a storage battery such as a Li-ion battery. In one example, in order to preserve the lifetime, the power storage section 225 is charged to 80% using constant current charging, and the remaining 20% is charged using constant voltage charging. The power per unit time necessary for the charging is the product of the battery voltage and the charging current. Therefore, when the charging voltage of the power storage section 225 rises due to progression of the constant current charging, the necessary power per unit time al so rises.

Here, the charging apparatus 100 sets charging conditions in a manner to optimize the transmission efficiency. For example, there are cases where, when the charging apparatus 100 draws in power exceeding an optimal condition to be received by the power receiver 220, the input voltage of the charging apparatus 100 is reduced and the power being received is also significantly reduced. In such a case, the transmission efficiency of the power feeding system is reduced. The charging apparatus 100 of the present example can improve the transmission efficiency of the power feeding system 200 by optimally controlling the power being received by the power receiver 220.

The charging conditions may include the magnitude of the charging current, the magnitude of the charging voltage, and the like. In one example, the charging apparatus 100 switches between various operational modes such as a pre-charging mode with a low current and a fast charging mode with a high current, according to the voltage of the power storage section 225. For example, the charging apparatus 100 switches the magnitude of the charging current in a stepped manner, according to the necessity of a case of transitioning to the fast charging or the like.

In the present example, a case is shown in which the power transmitter 210 charges a single power receiver 220, but the power transmitter 210 may transmit a wireless signal to each of a plurality of power receivers 220. The power transmitter 210 may communicate with the plurality of power receivers 220 using load modulation communication, while feeding power to the plurality of the power receivers 220 with wireless signals. Furthermore, when the load modulation is applied between the power transmitter 210 and one of the plurality of power receivers 220, it is possible for the load modulation signal to be propagated between the power transmitter 210 and all of the power receivers 220.

Figure 1B:
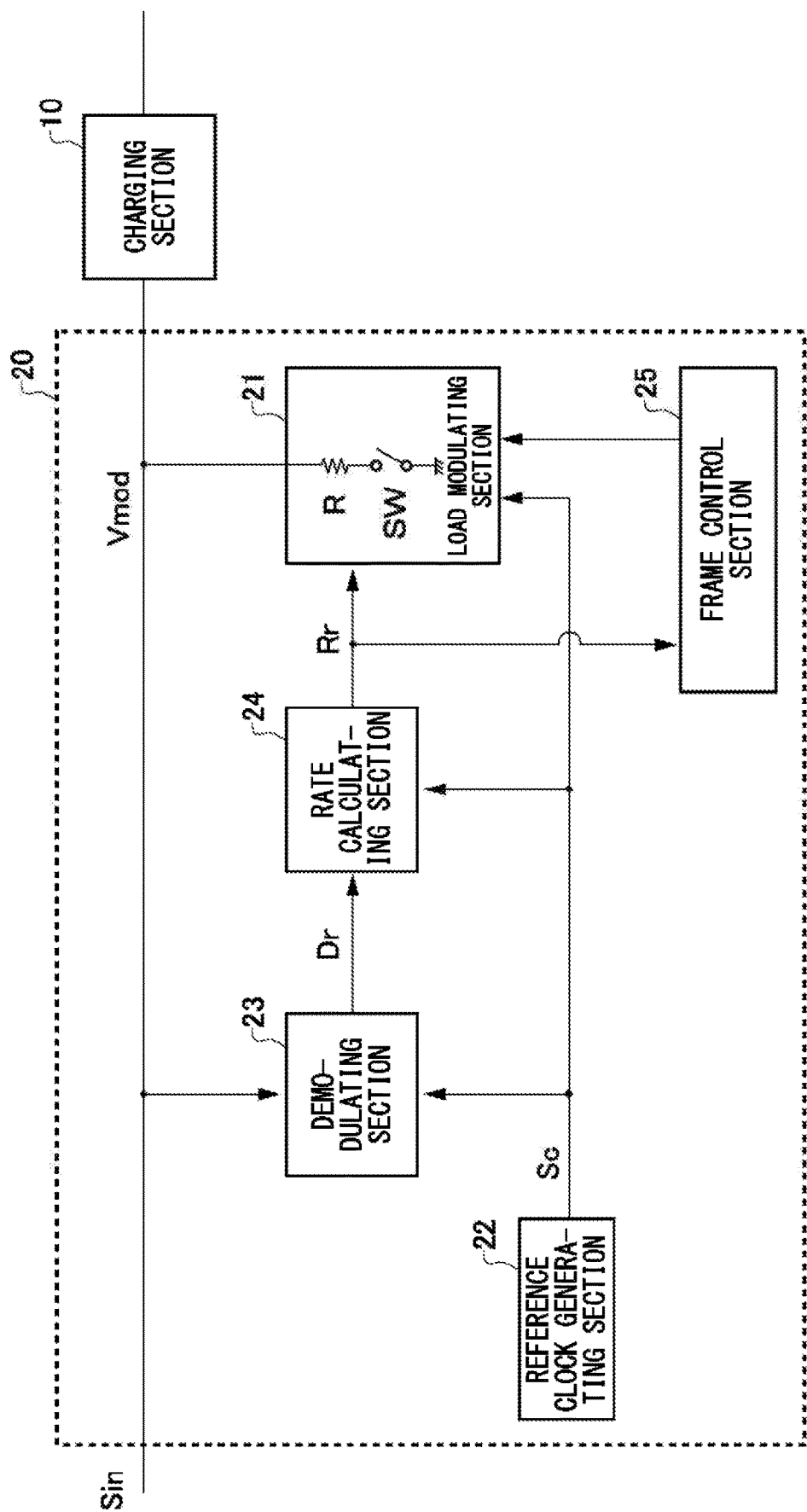
FIG. 1B shows an example of a detailed configuration of the charging apparatus 100.

FIG. 1B shows an example of a detailed configuration of the charging apparatus 100. The charging apparatus 100 includes a charging section 10 and a frame control apparatus 20.

The charging section 10 is a charger that charges the power storage section 225. The input signal Sin corresponding to the wireless signal transmitted from the power transmitter 210 is input to the charging section 10. The charging section 10 is provided between the rectifier 223 and the power storage section 225. For example, the charging section 10 includes a DC-DC converter that has a MOS switch and a coil.

The frame control apparatus 20 controls the communication frames of the power feeding system 200. The frame control apparatus 20 includes a load modulating section 21, a reference clock generating section 22, a demodulating section 23, a rate calculating section 24, and a frame control section 25.

The load modulating section 21 modulates an input voltage Vmod by load-modulating the input of the charging apparatus 100. The load modulating section 21 of the present example includes a switch SW and a resistor R connected in series. The load modulating section 21 changes the impedance of the power receiver 220 in order to transmit the charging information to the power transmitter 210. For example, the charging information includes the battery voltage of the power storage section 225, the charging current for the power storage section 225, the input voltage to the charging section 10, abnormalities in the temperature of the power storage section 225, and the like. The load modulating section 21 causes a change from the input voltage Vmod to a resistance value connected to the ground, by switching the switch SW. Data 1 occurs when the switch SW is ON, and data 0 occurs when the switch SW is OFF.

The reference clock generating section 22 generates a predetermined reference clock signal Sc. The reference clock generating section 22 inputs the generated reference clock signal Sc to the load modulating section 21, the demodulating section 23, and the rate calculating section 24.

The demodulating section 23 demodulates the input signal Sin, which includes a synchronization command. The input signal Sin includes the modulated signal transmitted from the power transmitter 210. The demodulating section 23 operates according to the reference clock signal Sc. The demodulating section 23 demodulates rate reference data Dr from the synchronization command, and inputs this rate reference data Dr to the rate calculating section 24. The rate reference data Dr is described further below.

The synchronization command is a command for synchronizing the communication frames between the power transmitter 210 and the power receiver 220. The synchronization command may be transmitted from the power transmitter 210 to a plurality of power receivers 220. In a case where a plurality of power receivers 220 are provided as well, it is possible to achieve synchronization among the power receivers 220 by synchronizing the communication frames using the power transmitter 210 as a reference.

The rate calculating section 24 calculates a rate reference value R used for reference, by counting the synchronization command based on the reference clock signal Sc. The rate calculating section 24 inputs the calculated rate reference value Rr to the load modulating section 21. The rate reference value Rr is described further below.

The frame control section 25 causes the load modulating section 21 to perform the load modulation operation with allocated time slots, in a communication frame counted according to the rate reference value Rr. The load modulating section 21 generates a load modulation signal with a data rate based on the rate reference value Rr. In other words, the frame control section 25 causes the load modulating section 21 to operate with synchronized communication frames.

The frame control apparatus 20 of the present example synchronizes the communication frames between the power transmitter 210 and the power receiver 220. Furthermore, the frame control apparatus 20 operates with the rate reference value Rr corresponding to the clock signal of the power transmitter 210. Therefore, even in a case where the clock of the power transmitter 210 and the clock of the power receiver 220 have different error amounts, the frame control apparatus 20 can eliminate the clock error amounts and avoid interference in the load modulation signal.

Figure 2A:
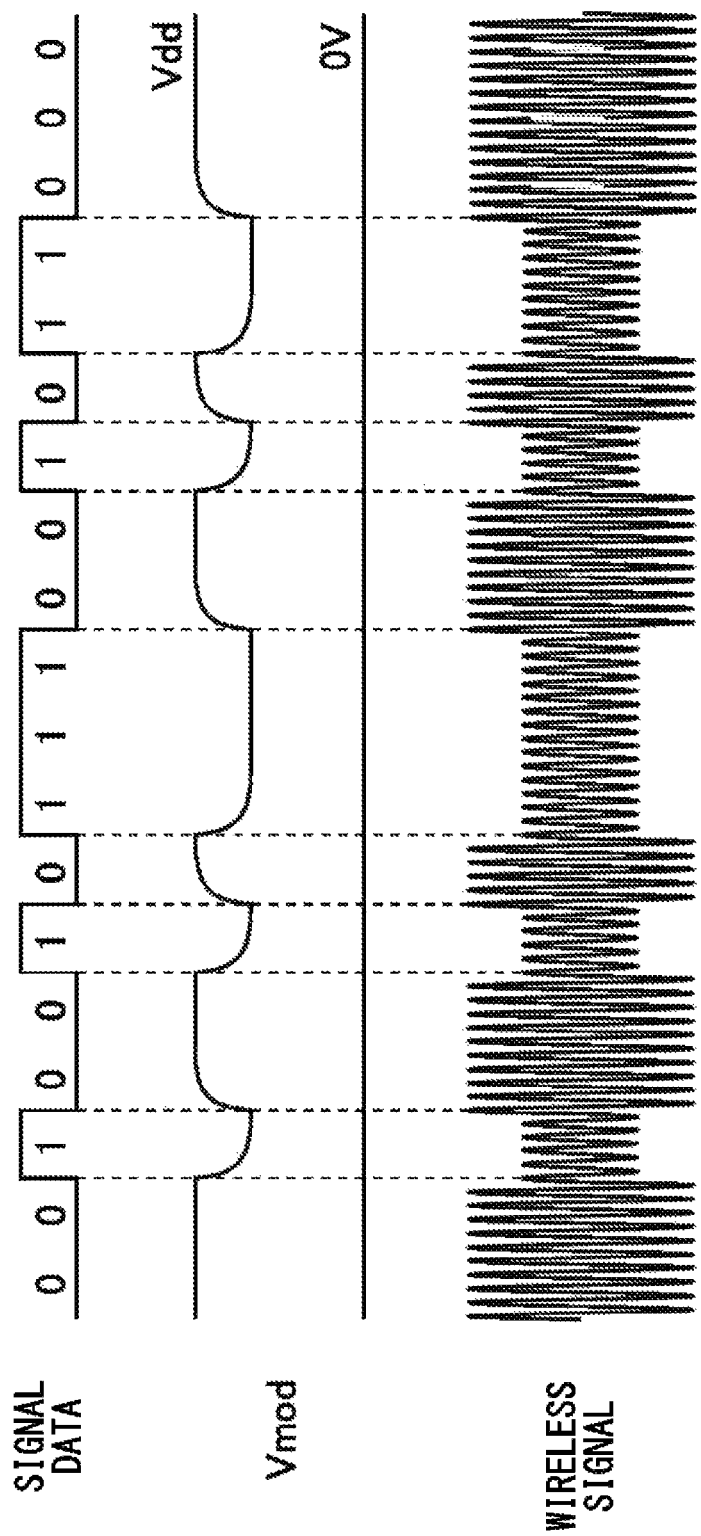
FIG. 2A is a diagram for describing a wireless signal transmitted by the power feeding system 200.

FIG. 2A is a diagram for describing a wireless signal transmitted by the power feeding system 200. The power feeding system 200 of the present example realizes communication between the power transmitter 210 and the power receiver 220 using load modulation.

The signal data is input to the load modulating section 21, and turns the switch SW of the load modulating section 21 ON and OFF. For example, the switch SW is OFF when the signal data is "0", and the switch SW is ON when the signal data is "1". By turning the switch SW ON and OFF, the input impedance of the power receiver 220 is changed.

The input voltage Vmod is AM-modulated according to the change in the input impedance of the power receiver 220. For example, the input voltage Vmod drops from a power source voltage Vdd due to the switch SW being turned ON, and returns to the power source voltage Vdd due to the switch SW being turned OFF.

The wireless signal includes information concerning the input voltage Vmod that has been AM-modulated. In this way, the power transmitter 210 and the power receiver 220 can transmit and receive the charging information by transferring the AM-modulated information in the wireless signal. By having the power transmitter 210 transmit and receive the charging information with the power receiver 220, it is possible to control the operation of the power transmitter 210 according to the charging progression situation of the power storage section 225.

Figure 2B:
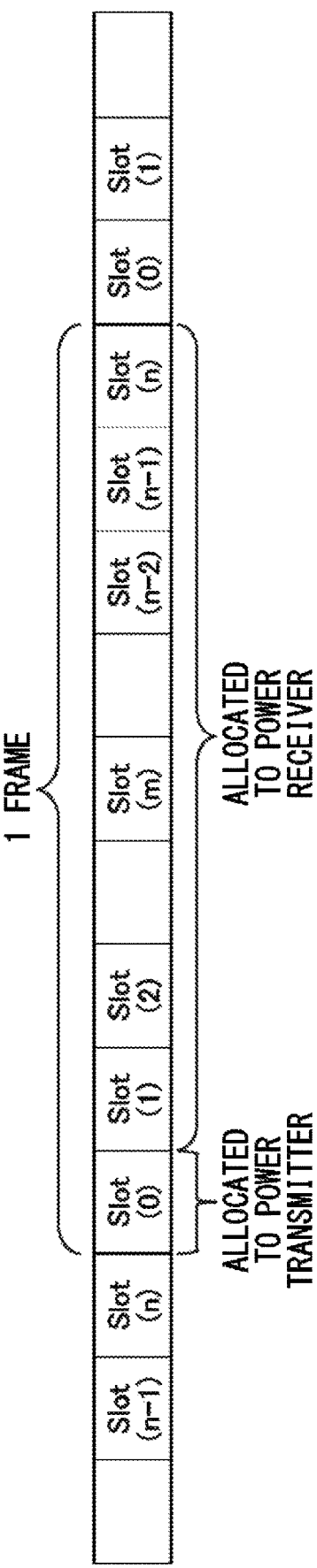
FIG. 2B shows an example of a load modulation communication frame caused by the power feeding system 200.

FIG. 2B shows an example of a load modulation communication frame caused by the power feeding system 200. Among the communication frames, each frame includes N time slots that are Slot(0) to Slot(n). Here, N is an integer greater than or equal to 2.

Each of the N time slots is allocated to one of the power transmitter 210 and the power receiver 220. In the present example, the time slot allocated to the power transmitter 210 is Slot(0). The time slots that are not allocated to the power transmitter 210 are allocated to one power receiver 220. By suitably allocating the time slots, the timings at which load modulation is applied by the power transmitter 210 and by the power receiver 220 are prevented from overlapping. Furthermore, when the power feeding system 200 communicates with a plurality of power receivers 220, it is possible to avoid interference between the power receivers 220 by setting the time slots of the plurality of power receivers 220 to be time slots differing from each other.

Figure 3:
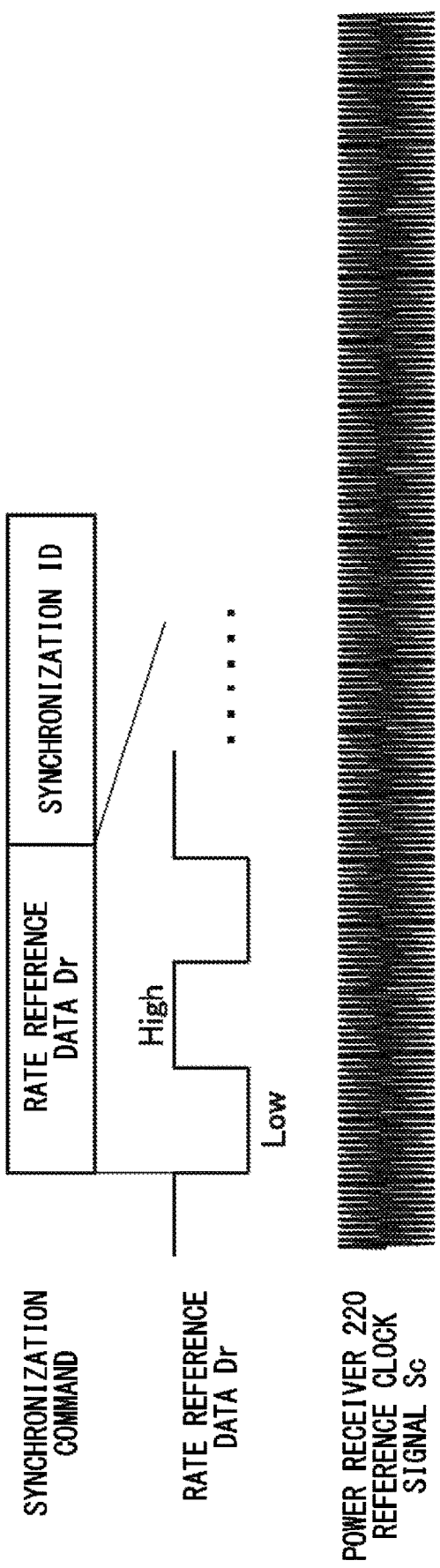
FIG. 3 shows an example of a synchronization command transmitted by the power transmitter 210 using load modulation.

FIG. 3 shows an example of a synchronization command transmitted by the power transmitter 210 using load modulation. This drawing shows a relationship between the synchronization command and the reference clock signal Sc of the power receiver 220. The synchronization command of the present example includes the rate reference data Dr and a synchronization ID.

The rate reference data Dr is a signal that causes the power receiver 220 to start referencing the data, in order to execute the command. In one example, the rate reference data Dr is a signal that repeats a combination of Low and High with a constant period (i.e. the data rate). The rate reference data Dr repeats Low and High a predetermined number of times. When a predetermined data rate is counted an arbitrary number of times, the power receiver 220 recognizes the demodulated signal as the rate reference data Dr. The rate reference data Dr is counted using the reference clock signal Sc, which is faster than the data rate. The rate reference data Dr may also serve as preamble data indicating the start point of the signal.

The synchronization ID is a header indicating that the command is a command to execute synchronization. The synchronization ID includes a predetermined data arrangement. The synchronization ID is transmitted after the rate reference data Dr. The load modulating section 21 starts counting the time slots caused by the rate reference value Rr, in response to the demodulation of the synchronization ID. The rate reference value Rr is calculated from the number of bits and the number of counts of the rate reference data Dr.

The present example shows a case where the content of the synchronization command is the rate reference data Dr and the synchronization ID, but the synchronization command content is not limited to this. For example, in a case where the power transmitter 210 and the power receiver 220 use shared preamble data, ID data having a determined number of bits is set immediately after the shared preamble data. In this case, it is possible to identify the type of command from the power transmitter 210 and the type of response from the power receiver 220 according to the predetermined ID data.

Furthermore, the preamble data may differ between the data from the power transmitter 210 and the data from the power receiver 220, and setting may be performed such that only the synchronization command is received from the power transmitter 210. In this case, one of the synchronization ID or the rate reference data Dr can also serve as the other.

Figure 4:
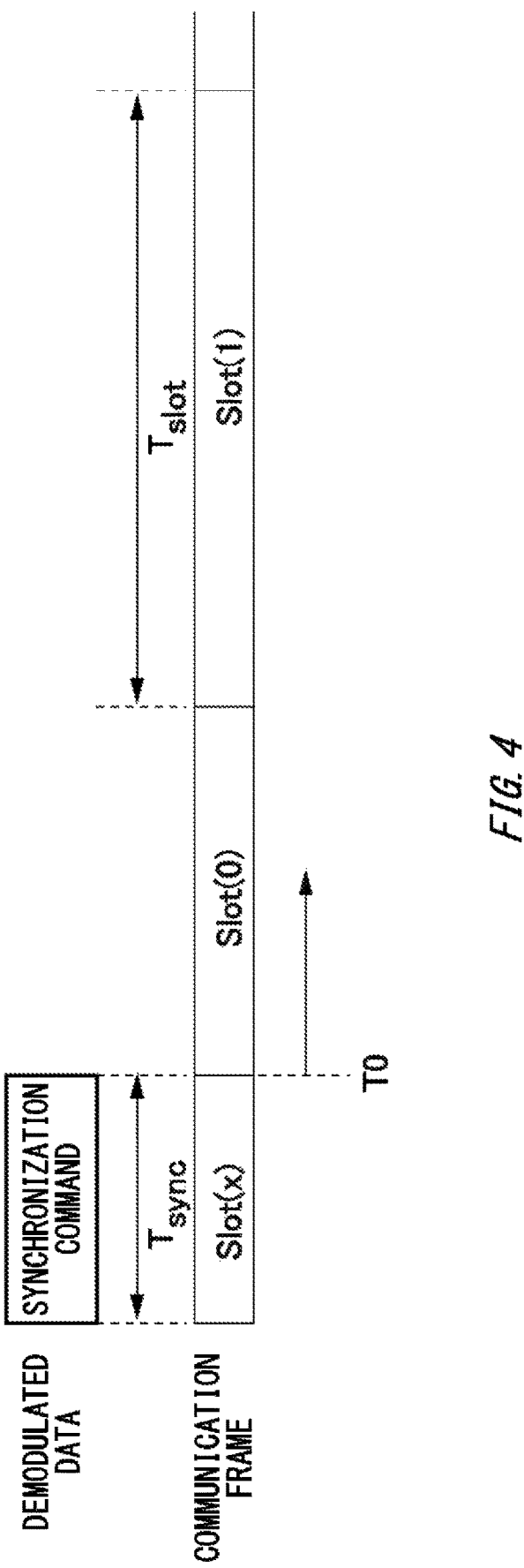
FIG. 4 shows an example of a time slot counting method using the rate reference value Rr.

FIG. 4 shows an example of a time slot counting method using the rate reference value Rr. Here, a case is imagined in which the synchronization command is transmitted from the power transmitter 210, and the communication frames of the power receiver 220 are synchronized with the communication frames of the power transmitter 210. The synchronization command may be transmitted simultaneously to a plurality of power receivers 220.

Here, $T_{sync}$ indicates the length of the synchronization command. The synchronization command is a data arrangement with a predetermined length. Therefore, $T_{sync}$ can be counted using the reference clock signal Sc.

Furthermore, $T_{slot}$ indicates the time slot length of one slot. In the present example, a case is imagined in which each slot has the same slot length $T_{slot}$. In other words, in the communication frame using the power transmitter 210 as a reference, the slot length of Slot(0) and the slot length of Slot(1) are both $T_{slot}$. However, the slot lengths of respective slots may differ instead.

Here, when the clock of the power transmitter 210 and the clock of the power receiver 220 have different error amounts, there are cases where time slot misalignment occurs between the power transmitter 210 and the power receiver 220. The frame control section 25 synchronizes the leading time slots using the synchronization command.

For example, the frame control section 25 determines the leading time slots by subtracting the command length of the synchronization command from the slot length of the time slot at which the reception of the synchronization command started. In the present example, the frame control section 25 corrects the time slot of Slot(0) by subtracting the command length $T_{sync}$ of the synchronization command from the original slot length $T_{slot}$ of Slot(0). In this way, the frame control apparatus 20 sets the lead of the communication frame of the power receiver 220 in alignment with the communication frame of the power transmitter 210. In this way, the frame control apparatus 20 can synchronize the communication frames of the power transmitter 210 and the power receiver 220.

Furthermore, the frame control apparatus 20 corrects the time slot with a data rate in accordance with the reference clock signal of the power transmitter 210. For example, the frame control apparatus 20 counts the communication frame while setting the slot length to be a constant multiple of the rate reference value Rr. When the demodulating section 23 demodulates the synchronization command, the frame control apparatus 20 resumes the counting of Slot(0) from the timing T0, using the rate reference value Rr. In this way, the frame control apparatus 20 can perform load modulation with the same data rate as the power transmitter 210, using the rate reference value Rr.

In a case where a plurality of power receivers 220 are provided, the synchronization command is transmitted simultaneously to the plurality of power receivers 220 from the power transmitter 210. The plurality of power receivers 220 each acquire the rate reference value Rr to have the same data rate length. In this way, the charging apparatus 100 can avoid overlap among the timings of the slots allocated to the power transmitter 210 and the plurality of power receivers 220. Accordingly, even in a situation where the wireless signal is large, such as in the power feeding system 200, and interference between signals is a problem, it is possible to avoid interference between the signals by shifting the timings.

Furthermore, in the wireless power feeding system, due to miniaturization and restriction of power consumption of the power receiver itself, there are many cases where the clock generated by the reference clock generating section 22 has a large error caused by manufacturing variations or fluctuations in temperature or voltage. Because of this, among a plurality of power receivers 220, it is expected that there will be a problem that the timing of each clock is misaligned and the timings of the respectively allocated slots will overlap. In the power feeding system 200 of the present example, even in a case where there is misalignment among the clocks of the power receivers 220, it is possible to substantially eliminate the clock misalignment by synchronizing the communication frames.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: charging section, 20: frame control apparatus, 21: load modulating section, 22: reference clock generating section, 23: demodulating section, 24: rate calculating section, 25: frame control section, 100: charging apparatus, 200: power feeding system, 210: power transmitter, 211: power source, 212: impedance setting section, 213: demodulator, 214: matching network, 215: antenna, 220: power receiver, 221: antenna, 222: matching network, 223: rectifier, 225: power storage section

What is claimed is:

1. A frame control apparatus that controls communication frames of a wireless power feeding system, the frame control apparatus comprising:
   a reference clock generating section that generates a predetermined reference clock signal;
   a demodulating section that operates according to the reference clock signal and demodulates a synchronization command for synchronizing the communication frames;
   a rate calculating section that counts pieces of rate reference data having a predetermined length and included in the synchronization command, based on the reference clock signal, to calculate a rate reference value used for reference; and
   a frame control section that controls the communication frames based on the rate reference value, wherein
   the frame control section determines a leading time slot by subtracting a command length of the synchronization command from a slot length of a time slot at which reception of the synchronization command starts.

2. The frame control apparatus according to claim 1, wherein
   the synchronization command includes a synchronization ID indicating synchronization, after the rate reference data, and
   the frame control section starts counting time slots with the rate reference value in response to demodulation of the synchronization ID.

3. The frame control apparatus according to claim 2, further comprising:
   a load modulating section that applies load modulation to an input voltage of an input signal that is input to the frame control section, wherein
   the load modulating section generates a load modulation signal with a data rate based on the rate reference value.

4. The frame control apparatus according to claim 3, wherein
   the frame control section causes the load modulating section to perform load modulation with an allocated time slot at the communication frame counted according to the rate reference value.

5. A charging apparatus comprising:
   a charging section that charges a power storage section; and
   the frame control apparatus according to claim 4.

6. A power receiver comprising:
an antenna that receives a wireless signal from a transmitter;
the charging apparatus according to claim 5; and
a power storage section that is charged by the charging apparatus.

7. A power feeding system comprising:
one or more power receivers, each being the power receiver according to claim 6; and
a power transmitter that transmits a wireless signal for charging the power storage section to the power receiver.

8. A frame control apparatus that controls communication frames of a wireless power feeding system, comprising:
a reference clock generating section that generates a predetermined reference clock signal;
a demodulating section that operates according to the reference clock signal and demodulates a synchronization command for synchronizing the communication frames formed by periodically repeating a plurality of time slots, each of which is allocated to a power transmitter or a power receiver;
a rate calculating section that counts pieces of rate reference data having a predetermined length and included in the synchronization command, based on the reference clock signal, to calculate a reference rate reference value; and
a frame control section that controls the communication frames based on the rate reference value.

9. The frame control apparatus according to claim 8, wherein
the frame control section determines a leading time slot by subtracting a command length of the synchronization command from a slot length of a time slot at which reception of the synchronization command starts.

10. The frame control apparatus according to claim 8, wherein
the synchronization command includes a synchronization ID indicating synchronization, after the rate reference data, and
the frame control section starts counting time slots according to the rate reference value, in response to demodulation of the synchronization ID.

11. The frame control apparatus according to claim 10, further comprising:
a load modulating section that applies load modulation to an input voltage of an input signal that is input to the frame control section, wherein
the load modulating section generates a load modulation signal with a data rate based on the rate reference value.

12. The frame control apparatus according to claim 11, wherein
the frame control section causes the load modulating section to perform load modulation with allocated time slots at the communication frame counted according to the rate reference value.

13. A charging apparatus comprising:
a charging section that charges a power storage section; and
the frame control apparatus according to claim 12.

14. A power receiver comprising:
an antenna that receives a wireless signal from a transmitter;
the charging apparatus according to claim 13; and
a power storage section that is charged by the charging apparatus.

15. A power feeding system comprising:
one or more power receivers, each being the power receiver according to claim 14; and
a power transmitter that transmits a wireless signal for charging the power storage section to the power receiver.

16. A frame control method for controlling communication frames of a wireless power feeding system, the frame control method comprising:
generating a predetermined reference clock signal;
demodulating, according to the reference clock signal, a synchronization command for synchronizing communication frames formed by periodically repeating a plurality of time slots, each of which is allocated to a power transmitter or a power receiver;
calculating a rate reference value as a reference by counting pieces of rate reference data having a predetermined length and included in the synchronization command, based on the reference clock signal; and
controlling the communication frames based on the rate reference value.

* * * * *